UNITED STATES PATENT OFFICE.

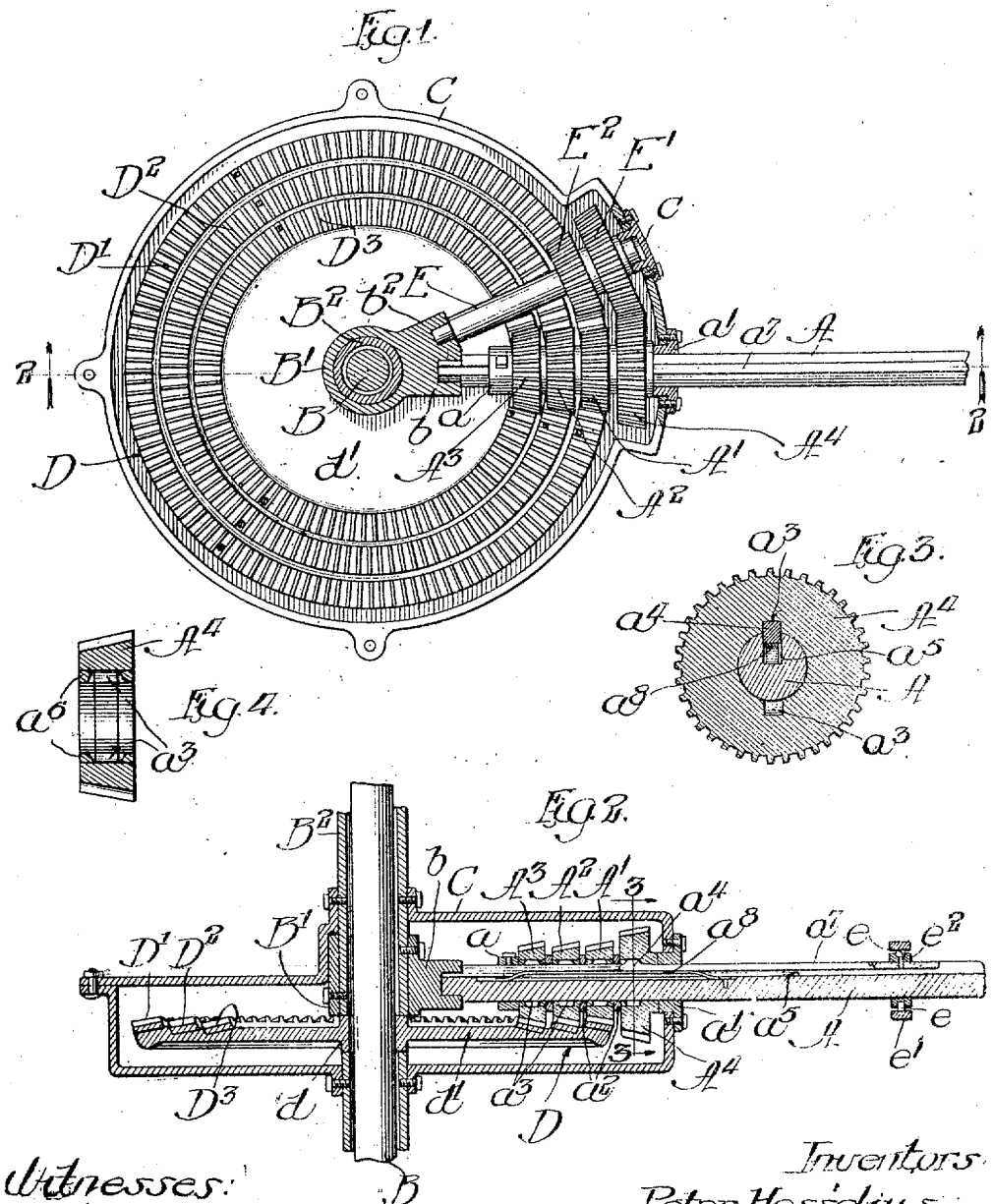

PETER HESSELIUS AND JOHN JADERLUND, OF CHICAGO, ILLINOIS.

VARIABLE-SPEED POWER-TRANSMITTING GEAR.

No. 874,404.

Specification of Letters Patent.

Patented Dec. 24, 1907.

Application filed March 12, 1907. Serial No. 361,959.

*To all whom it may concern:*

Be it known that we, PETER HESSELIUS and JOHN JADERLUND, citizens of the United States, and residents of Chicago, in the county of Cook and State of Illinois, have invented certain new and useful Improvements in Variable-Speed Power Transmitting Gears; and we do hereby declare that the following is a full, clear, and exact description thereof, reference being had to the accompanying drawings, and to the letters of reference marked thereon, which form a part of this specification.

This invention relates to variable speed power transmitting gears and refers more especially to a gear of that class in which any one of a set of gear wheels rotatively mounted on a shaft and meshing with another set of gears fixed to a second shaft can be non-rotatively secured to its shaft for the purpose of transmitting power from one of said shafts to the other.

Our invention may be better understood by reference to the accompanying drawings, in which—

Figure 1 is a side elevation of the main operative parts of the gear. Fig. 2 is a radial section on the line 2—2 of Fig. 1. Fig. 3 is a section on the line 3—3 of Fig. 2. Fig. 4 is a sectional view of one of the beveled gears of the driving shaft.

As shown in the said drawings, A designates a driving shaft, and B a driven shaft, disposed perpendicularly to each other. Said shafts have rotative bearing in a case or shell C which incloses the operative parts of said gear. Non-rotatively fixed to the shaft B is a gear wheel or disk D, comprising a hub $d$ and a web portion $d^1$, the latter provided on one of its lateral faces with a plurality of annular, concentric beveled gears $D^1$, $D^2$, $D^3$. On the driving shaft A are mounted four beveled pinions $A^1$, $A^2$, $A^3$ and $A^4$. Said pinions are normally loose on the shaft A, permitting the shaft to turn freely therein. The pinions $A^1$, $A^2$ and $A^3$ are of approximately equal diameter and mesh respectively with the annular beveled gears $D^1$, $D^2$ and $D^3$. Said pinions are secured against displacement longitudinally of the shaft A between inner and outer collars $a$, $a^1$ and are spaced from each other by collars $a^2$ which fit upon the shaft between said pinions. The shaft A has bearing in said collar $a^1$ and in a stepped bearing $b$ formed on a collar $B^1$ fixed to a tubular casing $B^2$ surrounding the shaft B.

Means are provided for non-rotatively securing any one of the pinions $A^1$, $A^2$, $A^3$ to its shaft in order to transmit rotary motion from said shaft A to the shaft B in varying ratios of angular velocity. Devices for this purpose are made as follows:

The pinions $A^1$, $A^2$ and $A^3$ are provided on the inner faces of the bores of their hubs with radial notches $a^3$ adapted to be severally engaged by a radially arranged key $a^4$ sliding endwise in a longitudinal groove $a^5$ in said shaft. The said notches $a^3$ in the bores of the gears do not extend throughout the length of the gears but are closed by rings $a^6$ fitting in annular recesses in the bores of the hubs, as best shown in Fig. 4. Said key is formed on or carried by the inner end of a longitudinally arranged sliding bar $a^7$ mounted in said groove. Said bar is pressed outward by means of a spring $a^8$ arranged in the bottom of the groove of said shaft A. The end faces of the key $a^4$, as well as the inner sides of the rings $a^6$ closing the notches $a^3$ engaged by said key, are beveled in order to facilitate the entrance of the key into and its withdrawal from the notches. To one end of said bar $a^7$ is fixed a shifting collar $e^2$ which surrounds the shaft A and has a circumferential groove engaged by studs $e$ on the fork $e^2$ of an actuating lever for shifting the key from one gear to another.

From the foregoing, it will be seen that endwise movement of the bar $a^7$ shifts the key $a^4$ from one of the gear wheels $A^1$, $A^2$, $A^3$ to another, thereby providing for fixing any one of said gears to the shaft at will and thus transmitting motion from the shaft A to the shaft B through any one of the varied diameter beveled gears $D^1$, $D^2$, $D^3$ as described. Likewise the key can be placed under or in engagement with any one of the collars $a^2$ between two of the gear wheels, allowing all of the said gear wheels to be released from the shaft A. The different diameters of the gears $D^1$, $D^2$, $D^3$ provide three ratios of angular velocity between the two shafts.

Means are provided for reversing the direction of rotation of the driven shaft, comprising reversing gears driven by the shaft A and meshing with the varied diameter beveled gears $D^1$, $D^2$, $D^3$. This feature of the mechanism is made as follows: E designates a short intermediate shaft arranged radially across the geared face of the gear wheel D in the plane of and at an acute angle to the shaft A. Said shaft is rotatively mounted at its outer end in a bearing $c$ in the casing C and at its inner end in a bearing lug $b^2$ integral with the collar $B^1$. Non-rotatively mounted on the outer end of said shaft E are a pair of beveled gear wheels $E^1$ and $E^2$. The outermost gear wheel $E^1$ is located radially outside of the gear wheel D and meshes with a beveled gear wheel $A^4$ mounted on the shaft A. The innermost gear wheel $E^2$ has constant meshing engagement with the beveled annular gear $D^1$ of the gear wheel D. The beveled gear wheel $A^4$ is made like the gears $A^1$, $A^2$, $A^3$ and is locked to rotate with the shaft A by the key $a^4$. Thus it will be seen that when the gear wheel $A^4$ is locked to the shaft A rotation of said shaft is transmitted to drive the shaft B in a direction the reverse of which it is driven through the gear wheels $A^1$, $A^2$, $A^3$.

We claim as our invention:—

1. In a variable speed power transmitting device, the combination with two rotative shafts arranged at an angle to each other, of a plurality of annular concentric gears mounted on one shaft, a plurality of gear wheels meshing therewith and loosely mounted on the other shaft, means for separately locking said gear wheels to their shaft, an intermediate shaft and two connected gears mounted thereon, one of said two connected gears meshing with a gear wheel on said gear wheel bearing shaft and the other meshing with one of said annular gears for the purpose set forth.

2. In a variable speed power transmitting device, the combination with two rotative shafts arranged at an angle to each other, of a plurality of annular concentric gears mounted on one shaft, a plurality of gear wheels meshing therewith and loosely mounted on the other shaft, means for separately locking said gear wheels to their shaft, an intermediate shaft arranged radially of said annular gears, and two connected gears mounted thereon, one of said two connected gears meshing with a gear wheel on said gear wheel bearing shaft, and the other meshing with one of said annular gears for the purpose set forth.

3. In a variable speed power transmitting device, the combination with a driving and a driven shaft arranged at an angle to each other, of a wheel or disk mounted on one of said shafts and provided on its lateral face with a plurality of annular, concentric beveled gears, a plurality of beveled gear wheels meshing therewith and loosely mounted on the other shaft, means for separately locking the gear wheels to their shaft, an intermediate shaft arranged radially of said annular gears and provided with two connected beveled gear wheels, one of which meshes with one of the annular beveled gears of the disk, and a beveled gear wheel normally loose on the shaft carrying the loosely mounted gears and adapted to be locked thereto, and meshing with the other gear of the intermediate shaft.

4. In a variable speed power transmitting device, the combination with a shaft, of a gear wheel rotatively mounted on said shaft and provided in its bore with a radial notch and with an annular recess, a ring detachably secured in said recess and adapted to close the adjacent end of said notch, and means for non-rotatively securing said gear wheel to its shaft, comprising a radially and longitudinally movable key mounted on the shaft and adapted to engage said notch.

In testimony, that we claim the foregoing as our invention we affix our signatures in the presence of two witnesses, this 2nd day of March A. D. 1907.

PETER HESSELIUS.
JOHN JADERLUND.

Witnesses:
WILLIAM L. HALL,
F. H. ALFREDS.